United States Patent [19]
Viertel et al.

[11] Patent Number: 5,577,791
[45] Date of Patent: Nov. 26, 1996

[54] MIRROR ASSEMBLY WITH COVER FOR MOTOR VEHICLE SUN VISOR

[75] Inventors: Lothar Viertel, Altforweiler, Germany; Patrick Welter, La Chambre, France

[73] Assignee: Gebr. Happich GmbH, Germany

[21] Appl. No.: 329,543

[22] Filed: Oct. 26, 1994

[30] Foreign Application Priority Data

Nov. 30, 1993 [DE] Germany .................. 43 40 685.8

[51] Int. Cl.$^6$ ....................................... B60J 3/00
[52] U.S. Cl. .................. 296/97.5; 359/844; 362/144
[58] Field of Search .................. 296/97.1, 97.5; 359/844, 871; 362/135, 136, 137, 140, 141, 142, 144

[56] References Cited

U.S. PATENT DOCUMENTS

| | | | |
|---|---|---|---|
| 4,653,798 | 3/1987 | White et al. | 296/97.5 |
| 4,796,944 | 1/1989 | Lobanoff et al. | 296/97.5 |
| 5,005,895 | 4/1991 | Muyres et al. | 296/97.8 |
| 5,022,699 | 6/1991 | Yoshida | 296/97.5 |
| 5,054,839 | 10/1991 | White et al. | 296/97.1 |
| 5,067,764 | 11/1991 | Lanser et al. | 296/97.5 |
| 5,188,446 | 2/1993 | Miller | 362/83.1 |
| 5,438,491 | 8/1995 | White | 296/97.5 X |

FOREIGN PATENT DOCUMENTS

| | | |
|---|---|---|
| 266327 | 5/1988 | European Pat. Off. . |
| 351468 | 1/1990 | European Pat. Off. . |
| 434769 | 7/1991 | European Pat. Off. . |
| 479064 | 6/1994 | European Pat. Off. . |
| 2429685 | 1/1980 | France . |
| 2453042 | 10/1980 | France . |
| 1971359 | 10/1967 | Germany . |
| 3324169 | 1/1985 | Germany . |
| 4031482 | 4/1992 | Germany . |
| 2233295 | 1/1991 | United Kingdom . |

*Primary Examiner*—Andrew C. Pike
*Attorney, Agent, or Firm*—Ostrolenk, Faber, Gerb & Soffen, LLP

[57] ABSTRACT

A sun visor for a motor vehicle has a mirror housing disposed in a depression in a surface of the sun visor body. A mirror is supported in the mirror housing. A sliding cover over the mirror is slidable to cover or expose the mirror. The visor body has a covering section over the sliding cover when it has moved to expose the mirror to view. The cover is automatically operable by a spring connected between the mirror housing and the cover for moving the cover to the mirror exposed position. The cover is locked against opening by a push button operated unlocking mechanism which normally locks the cover closed and which opens it upon the push button being operated. A card or ticket holder is held in a separate depression in the covering section of the visor body.

15 Claims, 3 Drawing Sheets

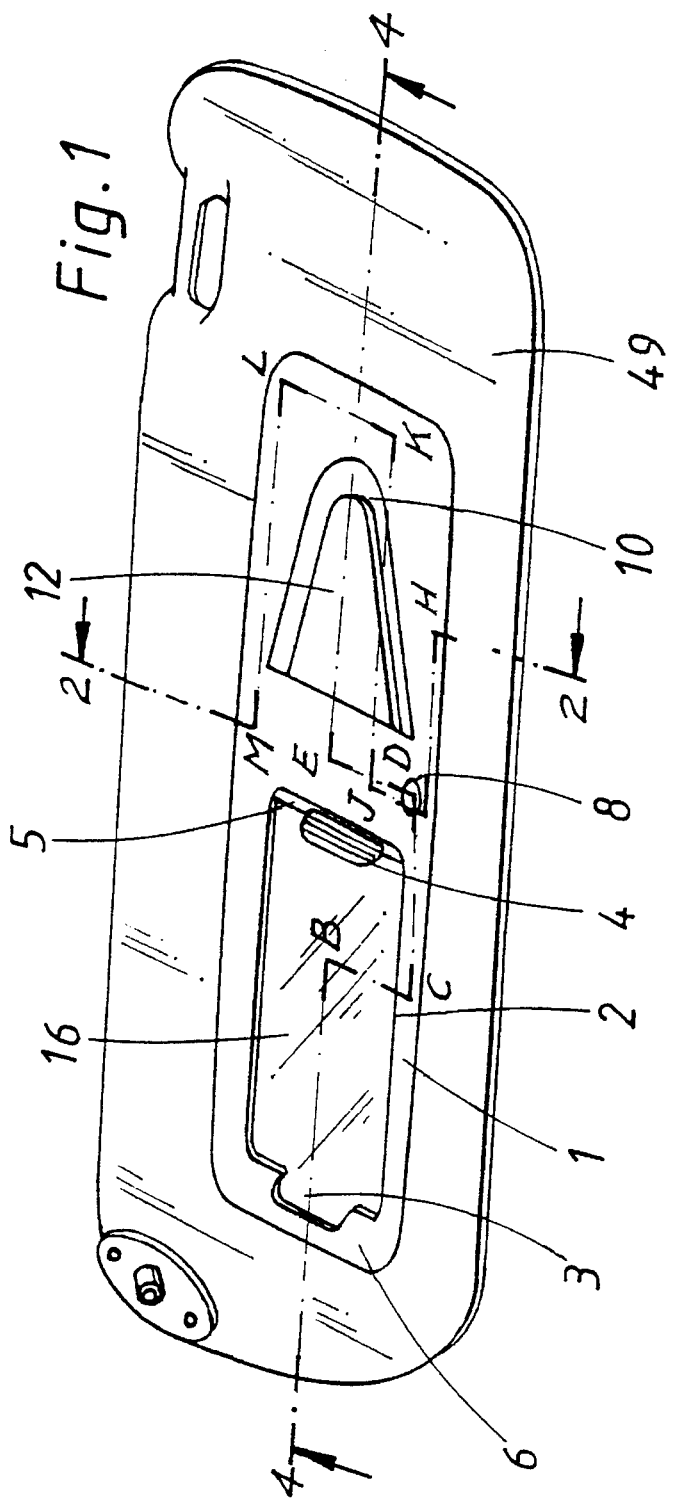
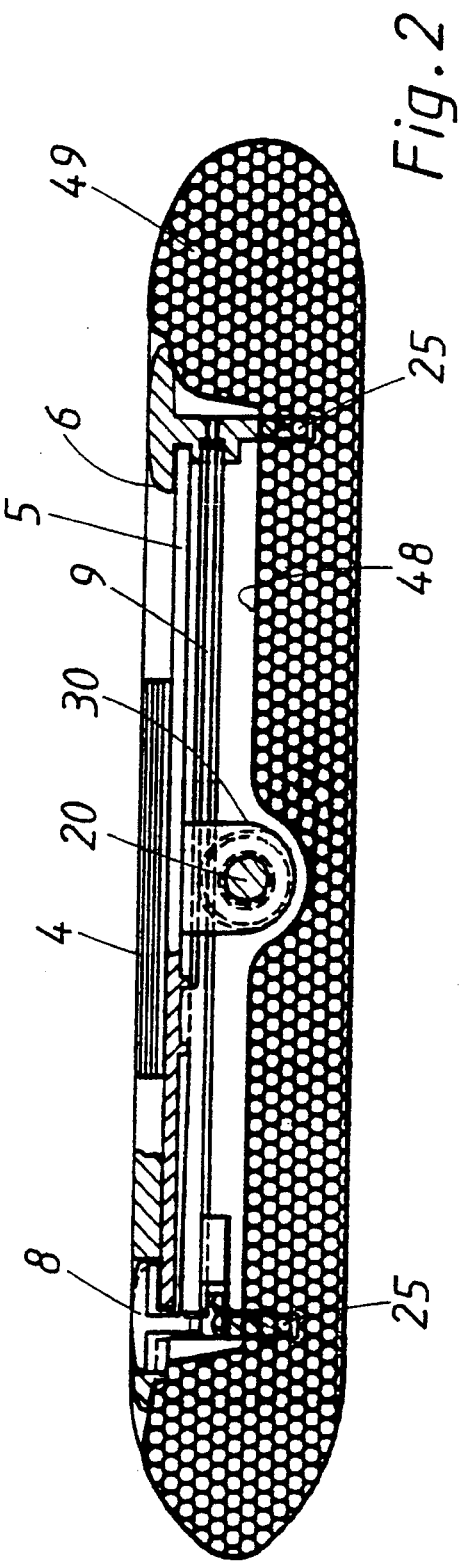

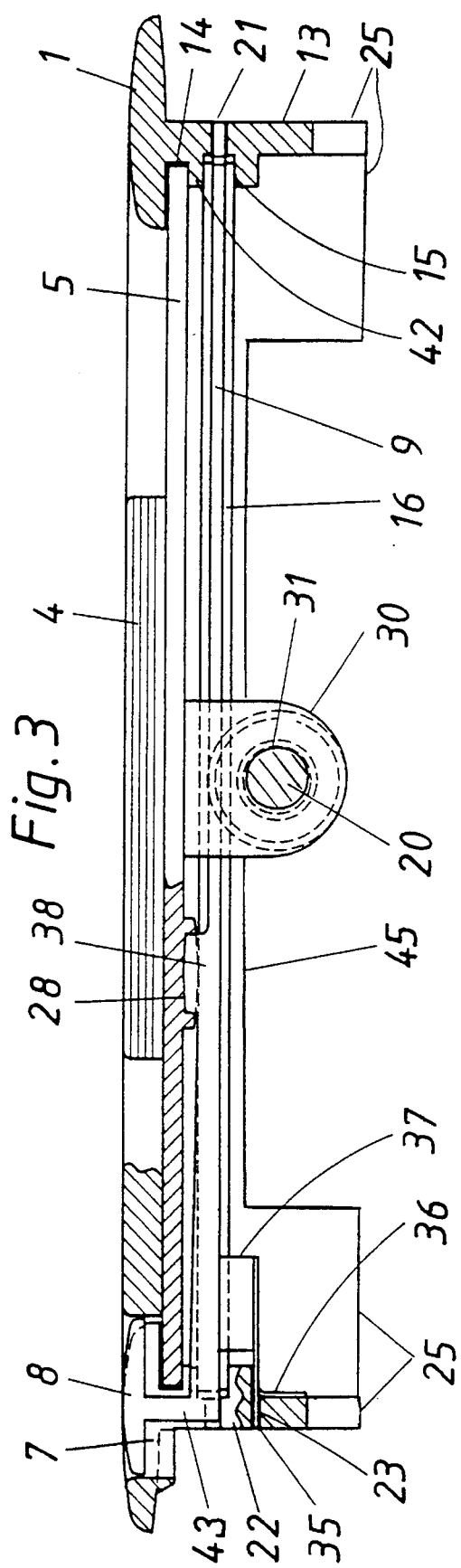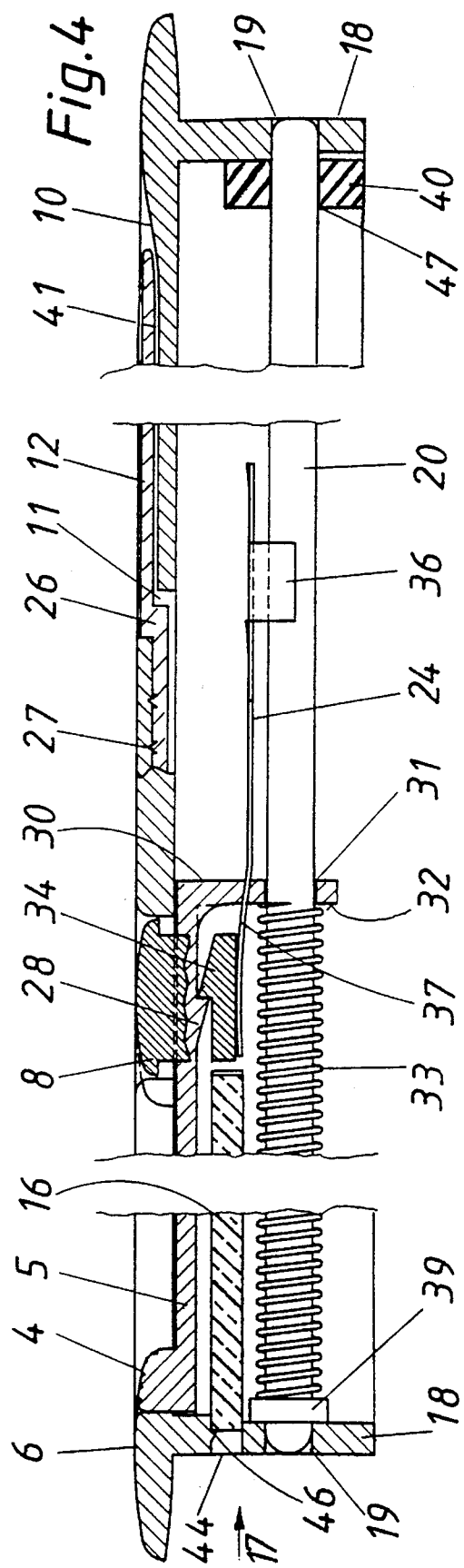

MIRROR ASSEMBLY WITH COVER FOR MOTOR VEHICLE SUN VISOR

BACKGROUND OF THE INVENTION

The present invention relates to a sun visor for motor vehicles having a sun visor body with one broad side having an opening into which a mirror assembly is inserted. The mirror assembly comprises a housing with a mirror and comprises a sliding cover which is mounted in the mirror housing and is displacable as desired between a position covering the mirror and a position freeing the mirror for viewing. The mirror housing has a covering section which substantially covers over the sliding cover when the cover is in the open position and the mirror is freed. A sun visor of this type is known from European Patent 0 266 327 B1.

SUMMARY OF THE INVENTION

The object of the present invention is to facilitate the operation of the sliding cover as well as to improve the style of the sun visor so as to create an additional value.

According to the invention, an automatic opening mechanism for the sliding cover is also arranged in the mirror housing. This eases the opening of the sliding cover and the freeing of the mirror for viewing, particularly as the automatic opening mechanism can respond, for instance, to pressing of a button. Should a customer prefer manual opening and automatic closing of the sliding cover, such a reversal of the system can also be accomplished.

The automatic opening mechanism can be actuated in a particularly simple fashion, by merely opening a locking device which holds the sliding cover in its closed position.

In order to reduce the structural expense, the automatic opening mechanism includes spring means. In particular, a pressure spring may be provided for the automatic opening mechanism. The spring can be cocked by displacement of the sliding cover into its position covering the mirror and the spring can be relaxed by loosening the locking device with the sliding cover being carried along into the position freeing the mirror.

In a preferred embodiment of the invention, the pressure spring is developed as a coil spring which is received by a guide rod which is mounted in the mirror housing and extends parallel to the direction of displacement of the sliding cover. One end of the pressure spring rests against the web present on the sliding cover. The other end rests against a web on the mirror housing. The individual parts of the automatic opening mechanism can thus be particularly simple, so that they can also be provided at particularly low cost.

In a further development, the locking device comprises two oppositely developed tooth-shaped elevations which can engage each other. One elevation is arranged on the underside of the sliding cover, and the other is arranged on an unlocking element. The unlocking element is developed with a push button which passes through a passage hole in the mirror housing and is supported by a return spring. With the exception of the spring elements, the individual parts are developed as plastic injection moldings. Therefore, both the tooth-shaped elevations and the push button can be developed in each case integrally thereon.

To increase the attractiveness of the sun visor, a further functional element is preferably arranged on the mirror housing. The mirror housing is further provided with a ticket clamp which is arranged in a recess in the housing. The clamp is preferably located in the section of the mirror housing which covers the sliding cover in the open position of the cover.

In the sun visor of the invention, the mirror housing can be premounted with the mirror, the sliding cover and the operating elements of the automatic opening device and the mirror housing can be attached as a structural unit to the sun visor body. The sun visor body is preferably comprised of polypropylene particle foam which makes it possible to form a material locked attachment to the mirror housing. For this purpose, the mirror housing has elevated regions or lugs of material which are heated and melted on their surface by a heated plate in the manner of reflection welding. These elevated lugs are then pressed into the material of the sun visor body in the bottom of the opening so as to combine with the material of the sun visor body producing material locking. Therefore, it is no longer necessary for the mirror housing to be connected by welding to the covering of the sun visor. As a result, recycling of the sun visor is substantially facilitated.

For the sake of completeness, the new sun visor may be provided with an illuminating device, such as that shown in, or similar to, European Patent 0 266 327 B1.

Other features and advantages of the present invention will become apparent from the following description of the invention which refers to the accompanying drawings.

BRIEF DESCRIPTION OF THE DRAWINGS

FIG. 1 is a top view of a sun visor of the invention with a mirror assembly installed;

FIG. 2 is a section along the path 2—2 in FIG. 1 which path has offsets at H–M;

FIG. 3 is a similar section along 2—2, but only through the mirror assembly;

FIG. 4 is a section along the path 4—4, which path has offsets at B–E, through the mirror assembly of FIG. 1.

DETAILED DESCRIPTION OF EMBODIMENTS OF THE INVENTION

Figure 5:
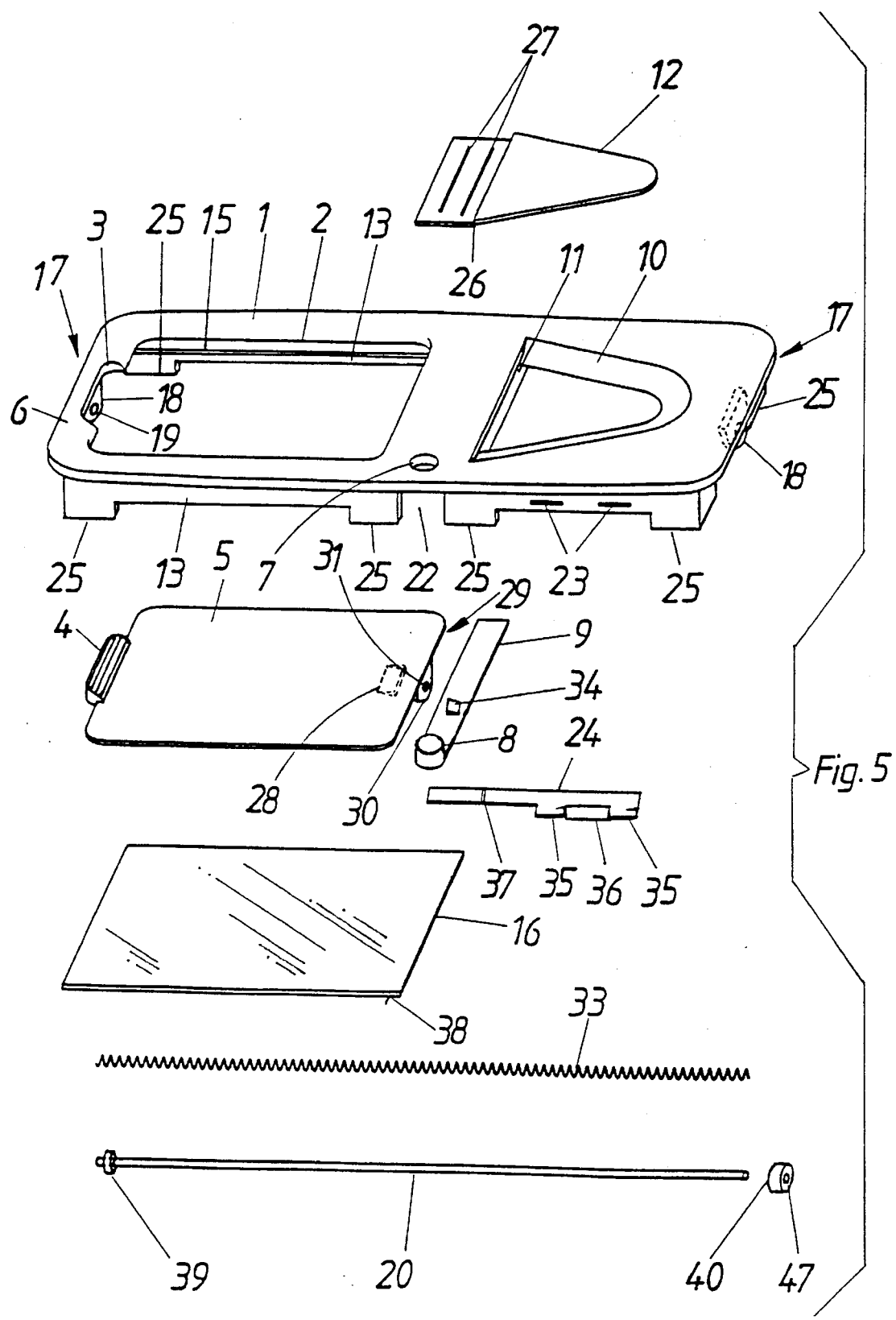
FIG. 5 is a perspective exploded view of the mirror assembly.

FIGS. 1 and 2 show a sun visor body 49 having an opening 48 in a broad side thereof to receive a mirror assembly. That assembly has a mirror housing 1.

The mirror housing 1 is provided on the viewing side with an opening 2 which forms the mirror viewing field. A bulge 3 receives a grip ledge 4 on the sliding cover 5. The grip ledge 4 is provided for closing the sliding cover 5. The ledge is adapted to the bulge 3, so that the housing edge 6 has a uniform appearance of closed shape. In the lower region of the visor body, approximately in the longitudinal center of the mirror housing 1, there is a passage hole 7 for positioning and actuating the push button 8. That button is integrated on the unlocking element 9. Alongside of the opening 2, the mirror housing 1 has a local depression 10 with an opening slot 11 for the ticket clamp 12.

On the bottom side of the mirror housing 1, there are two lengthwise ribs 13. In these ribs, guide grooves 14 are formed for the sliding cover 5, positioning grooves 15 are formed for the mirror 16, and webs 18 are arranged on the two end sides of the housing 1 with a positioning hole 19 for the guide bar 20. A slot 21 is arranged on one side in a lengthwise web 13 for receiving and mounting the unlocking element 9. A free region 22 in the other lengthwise web 13 guides the unlocking element 9. There are two receiving slots 23 in the one lengthwise web 13 below the button 8 for the insertion mounting of the leaf spring 24. The locally elevated regions 25 of the lengthwise webs 13 enable so-called reflection or vibration welding.

The ticket clamp 12 is adapted in its shape and dimensions to the depression 10 in the housing 1. It has a step-shaped offset 26 with at least two elevated wedge-shaped webs 27 for ultrasonic welding.

The sliding cover 5 has the grip ledge 4. On its underside, the cover has a wedge shaped elevation 28. On the end narrow side 29 of the cover, there is a web 30 which is provided with a receiving or guide hole 31 for the guide bar 20. The web 30 also acts as an application pressing surface 32 for the pressure spring 33.

The unlocking element 9 with the push button 8 developed on it has a wedge shaped elevation 34 for engaging with the wedge shaped elevation 28 of the sliding cover 5 when the sliding cover 5 is pushed into its closed position covering the mirror, which is the position in FIG. 4.

The leaf spring 24 has two insertion tongues 35 formed on it and has a web 36, which is bent off at a right angle, for resting against the adjacent lengthwise web 13. The spring also has a bend 37 along its length which is adapted in dimension and function to the unlocking element 9 in order to produce the required actuating or locking force.

When the mirror 16 is made of glass, it has a rear covering 38 for holding splinters in the event of the possible breakage of the mirror.

The guide bar 20 is preferably comprised of reinforced plastic. One end has a stop flange 39 developed on it. The opposite end of the bar carries a felt/rubber bumper 40 to act as a damping stop when it is struck by the sliding cover 5.

The pressure spring 33 is pushed over the guide bar 20 before the bar is mounted with the sliding cover 5 and the webs 18.

During the mounting, the mirror housing 1 is provided with the ticket clamp 12 such that the offset 26 of the ticket clamp 12 is inserted into the opening slot 11 provided for it in the mirror housing 1. The webs 27 of the clamp are then welded by ultrasonics and are thereby locally attached to the housing 1. The relative sizes of the depression 10 and of the ticket clamp 12 produces an air gap 41 for the possible introduction and storage of miscellaneous slips, tickets, etc. Depending on the desired styling, the ticket clamp 12 could have a respective customer logo integrated on its visible side.

As a second step, the sliding cover 5 is mounted, by pushing it from the bottom side of the mirror housing, that is from the side of the region of the ticket clamp, into the guide grooves 14 provided for this which are arranged in the left and right side lengthwise webs 13. Upon being moved into its closed position, the sliding cover 5 closes the mirror viewing field.

Next, the mirror 16 is inserted from the end side 17 through the slot 44 in the transverse wall 45 and into the positioning grooves 15 which are arranged to the left and right on the lengthwise webs 13. The elevation 46 in the slot 44 is intended to secure the mirror 16 against unintended shifting. The guide grooves 14 and the positioning grooves 15 are vertically separated by a spacer web 42 which creates a space between the sliding cover 5 and the mirror 16 in order to avoid rubbing, grinding, chattering, etc. Mirror 16 and sliding cover 5 now coincide in position with each other.

The unlocking element 9 can now be inserted with its smooth end into the slot 21 in the lengthwise web 13. The push button 8 then engages into the passage hole 7 provided for this purpose in the mirror housing 1 and the free region 32 of the lengthwise web 13 and is guided and positioned here.

The leaf spring 24 is pressed with the two insertion tongues 35 into the receiving slots 23 provided for this purpose in a lengthwise web 13. The bent off web 36 avoids tilting of the spring, since it rests against the inner wall of the lengthwise web 13. The bend 37 provides dimensional adaptation and stabilization of the leaf spring 24 and affords continuous pressure on the unlocking element 9. The spring force is so designed and predetermined that it is sufficient to hold the two wedge-shaped elevations 28 and 34 in the cover closed position shown in FIG. 4. This closing force can be overcome by finger pressure, in order to open or release the lock which is formed by the wedge elevations 28 and 34.

The guide bar 20, with the mounted pressure spring 33 pushed over it, is brought into its later final position in the following manner. First, the mirror cover 5 is pushed into its completely open position, wherein the felt or rubber bumper 40 is held between the remaining free region of the sliding cover web 30 and the web 18 on the mirror housing 1. The guide bar 20 is first pushed into the guide hole 31 in the web 30, and is then pushed into the hole 47 in the inserted bumper 40, and then into the receiving hole 19 in the web 18 on the mirror housing 1. The end of the guide bar 20 which is provided with the stop flange 39 is now pushed into the receiving hole 19 in the web 18.

Due to its predetermined design (length, turns, wire diameter, etc.), the pressure spring 33 now exerts a continuous force between the stop flange 39 and the stop pressure surface 32 of the cover, both in the closed and in the open positions of the sliding cover 5. If the push button 8 on the unlocking element 9 is now depressed, the wedge-shaped elevations 28 and 34 are separated and the spring force of the spring 33 causes the sliding cover 5 to spring open. The impact is taken up and damped by the rubber bumper 40. Even in the open position of the sliding cover 5, the pressure spring 33 still exerts sufficient pressure in order to hold the cover free of chattering and rattling in this position.

The complete mirror assembly can now be fastened in the opening 48 of adapted dimensions in the polypropylene sun visor body 49, which is, for instance, welded on its circumference. The attachment is effected preferably with the elevations 25 provided for this purpose, by means of reflection welding, ultrasonic welding, or infrared welding.

Although the present invention has been described in relation to a particular embodiment thereof, many other variations and modifications and other uses will become apparent to those skilled in the art. It is preferred, therefore, that the present invention be limited not by the specific disclosure herein, but only by the appended claims.

What is claimed is:

1. A sun visor for a motor vehicle, the sun visor comprising a sun visor body with a wide side, the wide side having an opening; and a mirror assembly comprising a mirror housing installed in the sun visor body opening, a mirror supported in the mirror housing, and a sliding cover mounted on the mirror housing over the mirror, the cover being slidable between a position covering the mirror and a position freeing the mirror to view;

the mirror assembly including a spring connected with the sliding cover and operable for sliding the sliding cover to the position freeing the mirror for view.

2. The sun visor of claim 1, wherein the mirror housing includes a covering section shaped and positioned for covering the sliding cover when the sliding cover has slid to the position freeing the mirror for view, such that the sliding cover moves beneath the covering section of the mirror housing.

3. The sun visor of claim 2, further comprising a ticket clamp supported on the mirror housing for receiving objects held to the mirror housing;

The mirror housing having a depression therein in which the ticket clamp is diposed so that the ticket clamp generally does not project above a surface of the sun visor body;

the depression for ticket clamp and the ticket clamp being arranged in the covering section of the mirror housing.

4. The sun visor of claim 1 further comprising a locking device which holds the sliding cover in the position covering the mirror, the spring being connected with the locking device such that actuation of the spring opens the locking device to free the cover to move to the position freeing the mirror for view.

5. The sun visor of claim 4, wherein the spring is disposed in the mirror housing so as to be locked by sliding of the cover into the mirror covering position and so as to be released by the step of opening of the locking device which releases the sliding cover to be slid by the spring into the position freeing the mirror for view.

6. The sun visor of claim 5, wherein the spring comprises a pressure spring which is pressurized when the cover is slid to the mirror covering position.

7. The sun visor of claim 6, wherein the mirror assembly further comprises:

a guide bar mounted in the mirror housing and extending parallel to sliding directions of the sliding cover between the positions thereof; and the pressure spring comprises a coil spring, the pressure spring being guided on the guide bar, the pressure spring having one end which rests against a part of the sliding cover and having another end which rests against the mirror housing.

8. The sun visor of claim 7, wherein the locking device comprises a first tooth-like element on the cover, an unlocking element disposed in the mirror housing and including a second tooth-like element engageable with the first tooth-like element and being so placed that with the first and second tooth-like elements in engagement, the cover is held in the mirror covering position, and a push button on the unlocking element and operable to move the unlocking element to disengage the tooth-like elements, thereby freeing the cover to be slid by the spring.

9. The sun visor of claim 8, wherein the cover has an underside into the mirror housing, the first tooth-like element is disposed on the underside of the sliding cover, and the second tooth-like element on the unlocking element extends up to engage the first tooth-like element at the underside of the cover.

10. The sun visor of claim 9, wherein the mirror housing has a passage hole therein through which the push button of the unlocking element is accessible for being operated.

11. The sun visor of claim 10, wherein the locking device further comprises a return spring operating on the push button with a force such that operation of the push button for operating the unlocking element operates against the force of the return spring.

12. The sun visor of claim 4, wherein the locking device comprising a first tooth-like element on the cover, an unlocking element disposed in the mirror housing and including a second tooth-like element engageable with the first tooth-like element and being so placed that with the first and second tooth-like elements in engagement, the cover is held in the mirror covering position, and a push button on the unlocking element and operable to move the unlocking element to disengage the tooth-like elements, thereby freeing the cover to be slid by the spring.

13. The sun visor of claim 12, wherein the sliding cover has an underside, and the first tooth-like element is disposed on the underside of the sliding cover, and the second tooth-like element on the unlocking element extends up to engage the first tooth-like element at the underside of the cover; and the mirror housing has a passage hole therein through which the push button of the unlocking element is accessible for being operated.

14. A sun visor for a motor vehicle, the sun visor comprising:

a sun visor body with a wide side and the wide side having an opening;

a mirror assembly comprising a mirror housing installed in the sun visor body opening, a mirror supported in the mirror housing, and a sliding cover mounted on the mirror housing over the mirror, the cover being slidable between a position covering the mirror and a position freeing the mirror to view;

the mirror assembly including an automatic opening mechanism connected with the sliding cover and operable for moving the sliding cover to the position freeing the mirror for view; and a ticket clamp supported on the mirror housing for receiving objects held to the mirror housing.

15. The sun visor of claim 14, wherein the mirror housing has a depression therein in which the ticket clamp is disposed so that the ticket clamp generally does not project above a surface of the sun visor body.

* * * * *